United States Patent
Hammon et al.

(10) Patent No.: US 12,522,556 B2
(45) Date of Patent: Jan. 13, 2026

(54) PROCESS FOR RECOVERING ACRYLIC ACID

(71) Applicant: BASF SE, Ludwigshafen am Rhein (DE)

(72) Inventors: Ulrich Hammon, Ludwigshafen am Rhein (DE); Klaus Joachim Mueller-Engel, Ludwigshafen am Rhein (DE); Steffen Rissel, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 694 days.

(21) Appl. No.: 17/801,806

(22) PCT Filed: Feb. 9, 2021

(86) PCT No.: PCT/EP2021/053090
§ 371 (c)(1),
(2) Date: Aug. 24, 2022

(87) PCT Pub. No.: WO2021/170397
PCT Pub. Date: Sep. 2, 2021

(65) Prior Publication Data
US 2023/0103803 A1    Apr. 6, 2023

(30) Foreign Application Priority Data
Feb. 25, 2020 (EP) .................... 20159363

(51) Int. Cl.
*C07C 51/48* (2006.01)
*B01D 11/04* (2006.01)
(Continued)

(52) U.S. Cl.
CPC .......... *C07C 51/48* (2013.01); *B01D 11/0488* (2013.01); *B01D 11/0492* (2013.01);
(Continued)

(58) Field of Classification Search
CPC ....... C07C 51/252; C07C 51/42; C07C 57/04; C07C 51/48
See application file for complete search history.

(56) References Cited

U.S. PATENT DOCUMENTS

| 6,166,248 A * | 12/2000 | Heida ............... C07C 51/48 562/545 |
| 2011/0036704 A1* | 2/2011 | Blum ............... C07C 51/252 203/31 |
| 2019/0083923 A1 | 3/2019 | Song et al. |

FOREIGN PATENT DOCUMENTS

| DE | 10332758 A1 | 5/2004 |
| EP | 3406587 A1 | 11/2018 |

(Continued)

OTHER PUBLICATIONS

International Search Report and Written Opinion received for PCT Patent Application No. PCT/EP2021/053090, mailed on May 4, 2021, 14 pages (6 pages of English Translation and 8 pages of Original Document).

*Primary Examiner* — Yate' K Cutliff
(74) *Attorney, Agent, or Firm* — Faegre Drinker Biddle & Reath LLP (57) ABSTRACT

The present invention relates to a process for recovering acrylic acid which is obtained by catalytic gas phase oxidation of propene,
  wherein, in an absorption stage (K2), the acrylic acid is absorbed from the reaction mixture (1) from the gas phase oxidation with a first solvent (3) and is drawn off for distillative purification, and a gas mixture from the absorption stage (K2) is passed onward to a condensation stage,
  wherein, in the condensation stage, the gas mixture is condensed, and a condensed phase of the gas mixture
(Continued)

is drawn off as acid water (4) and is subjected to a phase separation operation in a phase separation vessel (B1), comprising the steps of a) feeding the aqueous phase (4*) of the acid water (4) drawn off from the condensation stage that has been obtained in the phase separation vessel (B1) to an extraction stage (K7) in which acrylic acid present in the acid water (4) is extracted with a second solvent (5), b) feeding the acrylic acid-comprising extract (6) to a stripping column (K8) in which the acrylic acid is removed from the second solvent (5) with cycle gas (8), wherein the second solvent (5) removed is fed back again after the acrylic acid has been stripped out in the extraction stage (K7), c) feeding the acrylic acid-laden cycle gas (9) to a stripping cycle gas scrubber (K5) in which the acrylic acid is removed from the cycle gas with the first solvent stream (10) fed to the stripping gas scrubber (K5) and transferred into the first solvent (3), and d) feeding a first portion of the acrylic acid-laden first solvent (3) back to the absorption stage (K2).

The present invention further relates to a corresponding plant for recovery of acrylic acid.

13 Claims, 3 Drawing Sheets (51) Int. Cl.
*B01D 53/14* (2006.01)
*C07C 51/44* (2006.01)
*C07C 51/47* (2006.01)

(52) U.S. Cl.
CPC ..... *B01D 53/1431* (2013.01); *B01D 53/1487* (2013.01); *C07C 51/44* (2013.01); *C07C 51/47* (2013.01); *B01D 53/1493* (2013.01); *B01D 2252/205* (2013.01)

(56) References Cited

FOREIGN PATENT DOCUMENTS

WO 2011/000808 A2 1/2011
WO 2015/091628 A1 6/2015

* cited by examiner

PROCESS FOR RECOVERING ACRYLIC ACID

CROSS-REFERENCE TO RELATED APPLICATIONS

This application is a national stage application (under 35 U.S.C. § 371) of PCT/EP2021/053090, filed Feb. 9, 2021, which claims benefit of European Application No. 20159363.9, filed Feb. 25, 2020, both of which are incorporated herein by reference in their entirety.

The present invention relates to a process for recovering acrylic acid which is obtained by catalytic gas phase oxidation of propene.

Processes for preparing acrylic acid and for the purification and recovery thereof are known in principle from the prior art. On account of its very reactive double bond and its acid function, acrylic acid is a valuable monomer and intermediate for production of polymers that are used for a wide variety of different products, for example absorbent resins, binders for aqueous emulsion paints and the like.

Acrylic acid is produced on a large scale by a heterogeneously catalyzed partial gas phase oxidation of propene and/or acrolein with oxygen or oxygen-comprising gases in the presence of solid catalysts and at elevated temperature. In order to improve selectivity, the heterogeneously catalyzed partial oxidation of propene to acrylic acid is especially undertaken in two successive steps, wherein the first reaction step converts the propene to acrolein and the second reaction step the acrolein to acrylic acid, which is frequently conducted in two spatially separate reaction stages. What is obtained here is not pure acrylic acid but a product gas mixture comprising not only the acrylic acid product but also, as secondary component, unconverted acrolein and/or propene, and also water vapor, carbon dioxides, nitrogen, oxygen, propane, methane, lower saturated carboxylic acids such as formic acid, acetic acid and propionic acid, lower aldehydes such as formaldehyde, benzaldehyde and furfurals, and higher carboxylic acids or anhydrides thereof.

Some of these secondary components are of higher volatility than acrylic acid (for example acetic acid) and are also referred to as "low boilers". Others are of lower volatility than acrylic acid (for example phthalic anhydride) and are accordingly referred to as "high boilers". "Medium boilers" refer to secondary components having similar volatility to acrylic acid. The basic removal of the acrylic acid from the gaseous product gas mixture is generally effected by sorption methods, for example by countercurrent absorption of the acrylic acid with a first solvent or solvent mixture.

A distinction is nowadays made between four fundamental process variants for workup that lead to obtaining of the purified end product.

In a first process variant (which can also be referred to as "extraction method"), the solvent used is water, which scrubs the acrylic acid out of the gas stream after the synthesis. The further removal of the water is effected by an extraction and subsequent distillation steps.

In a second process variant (which can also be referred to as "azeotrope method"), the absorption is likewise followed by washing with water, and the removal of water is conducted by an entraining agent distillation (azeotropic distillation) and further distillation steps.

A further process variant (which can also be referred to as "crystallization method") involves fractionally condensing the reaction gas without adding a first solvent, with further workup by crystallization.

Finally, in a fourth process variant (which can also be referred to as "solvent method"), the acrylic acid is absorbed from the gas stream with a high-boiling hydrophobic first solvent. This absorption of acrylic acid is selective, meaning that the water vapor present in the gas stream from the synthesis remains largely in the gas phase.

These different four process variants differ both by the product quality obtained and the energy input needed and by the nature and composition of the streams of matter which are drawn off from the process and which obtain the secondary components removed.

The fourth process variant is described, for example, in WO 2011/000808 A2 in the form of a process for separation of acrylic acid, specifically a process for separation of acrylic acid from a product mixture from a heterogeneously catalyzed partial gas phase oxidation of at least one C3 precursor compound to give acrylic acid, which comprises not only acrylic acid, water vapor and glyoxal but also low boilers excluding the aforementioned compounds, medium boilers, high boilers and components that are difficult to condense as secondary constituents. In this process, the product gas mixture is cooled in a direct cooler by direct cooling with a finely sprayed cooling liquid, with evaporation of a portion of the cooling liquid. The cooled product gas mixture together with evaporated and unevaporated cooling liquid is guided into the bottom space of an absorption column which is connected to the absorption space of the absorption column above that has separating internals via a chimney tray KB1 present between the two that has at least one chimney, and from which the cooled product gas mixture and evaporated cooling liquid flow through the at least one chimney of the chimney tray KB1 into the absorption space and ascend therein in countercurrent to a high-boiling (first) absorbent descending therein. At the same time, absorbate A comprising acrylic acid absorbed in absorbent accumulates on the chimney tray KB1. From the chimney tray KB1, absorbate A comprising acrylic acid absorbed in absorbent that accumulates thereon is conducted out of the absorption column, a portion of absorbate A conducted out of the absorption column is fed to the bottom space of the absorption column to form a bottoms liquid present in the bottom space, and another portion of the absorbate A is optionally cooled and recycled into the absorption column above the chimney tray KB1. Low boilers are optionally stripped out of the remaining residual amount RA of absorbate A conducted out of the absorption column in a stripping unit to produce an absorbate A* depleted of low boilers. The residual amount RA of absorbate A or the absorbate A* is fed to a rectification column having a rectifying section and stripping section, the absorbent is enriched in the stripping section of the rectification column and absorbent with a proportion by weight of acrylic acid <1% by weight is conducted out of the stripping section, the acrylic acid is enriched in the rectifying section of the rectification column, and a crude acrylic acid P having a proportion by weight of acrylic acid >90% by weight is conducted out of the rectifying section. Absorbent-comprising bottoms liquid is withdrawn from the bottom space of the absorption column, a portion of this withdrawn bottoms liquid is fed as cooling liquid to the direct cooler, and the residual amount of this withdrawn bottoms liquid is sent to a distillation unit comprising a distillation column and a circulation heat exchanger, the bottoms liquid fed to the distillation unit is separated by distillation in the distillation column into vapors wherein the proportion by weight of absorbent is greater than the proportion by weight of absorbent in the bottoms liquid, and into liquid concentrate wherein the proportion by weight of constituents B that are higher-boiling than the absorbent is greater than the proportion by weight of constituents B in the bottoms liquid. A vapor stream, optionally after cooling and/or condensation thereof effected in an indirect heat exchanger, is recycled into the absorption column above the chimney tray KB1, and a volume flow rate M of the condensate that accumulates in liquid form at a level S is conducted out of the distillation column at temperature T1 at the lower end of the distillation column. A partial volume flow rate TAu of this volume flow rate M from the process of removing acrylic acid is discharged from the product mixture, and the residual stream RM of the volume flow rate M is returned to the distillation column above the withdrawal of the volume flow rate M from the distillation column with temperature T2>T1 via the circulation heat exchanger. The average dwell time tv of the constituents of the partial volume flow rate TAu in the distillation unit is <40 h.

The third process variant is disclosed, for example, in DE 103 32 758 A1 or WO 2015/091628 A1. In this process variant, the reaction gas, as in the fourth process variant, is cooled down by injecting and subsequent evaporation of a cooling liquid and then guided into a condensation column comprising separating internals. In this condensation column, the acrylic acid is absorbed by the reflux from the absorption column, still with enrichment of low-boiling and high-boiling compounds at the top and in the bottom region of the condensation column. In the lower third of the condensation column, a more than 90% by weight present acrylic acid is guided into a downstream crystallization system for further purification. The acrylic acid product is drawn off from the crystallization plant in a purity of >99% by weight. The impurities removed in the crystallization plant are recycled as "mother liquor" into the condensation column for further processing. At the bottom of the absorption column, a high boiler fraction is drawn off, which is transferred into a cleavage column, where oligomeric acrylic acid is cleaved into monomeric acrylic acid, and the acrylic acid removed is recycled in gaseous form into the condensation column. The high boiler residue is drawn off in liquid form from the bottom of the cleavage column and sent to a disposal unit. At the top of the condensation column, the gas exiting from the separating region of the absorption column is cooled in a condensation section, wherein condensable secondary components, essentially water of reaction and acetic acid and unremoved acrylic acid, are condensed out. The "acid water" thus obtained is transferred into a disposal unit at the top of the column via an extraction unit. In the extraction unit, the acrylic acid present in the acid water is removed and recycled into the absorption column.

What is common to the third and fourth process variants is that, after the removal of the acrylic acid from the water of reaction, acrylic acid still remains in the acid water. In the fourth process variant, the acrylic acid present in the acid water at a level of about 4% by weight is discarded, and incinerated in a thermal treatment plant together with other organic secondary components present in the acid water. With rising costs for raw materials and energy and with regard to environmental aspects, however, it is now of economic interest likewise to recover the residue of acrylic acid remaining in the acid water. By contrast, a proportion of acrylic acid in the acid water which is obtained in the third process variant, at 8% by weight to 15% by weight, is already higher in principle, and so recovery of acrylic acid was economically viable here, for example through extraction of the acrylic acid from the acid water.

A disadvantage of the workup in the fourth process variant, especially with respect to the third process variant, is distinctly elevated loss of valuable acrylic acid product, which has to date been extracted only inadequately from the acid water.

The objective technical problem addressed by the present invention is therefore that of specifying a process for recovering acrylic acid and of providing a corresponding plant with which the proportion of acrylic acid remaining in the acid water can be distinctly reduced, in order thus to improve the overall yield in acrylic acid production, especially with employment of the workup according to the fourth process variant.

This object is achieved in the first aspect of the present invention by a process for recovering acrylic acid which is obtained by catalytic gas phase oxidation of propene, wherein, in an absorption stage (K2), the acrylic acid is absorbed from the reaction mixture (1) from the gas phase oxidation with a first solvent (3) and is drawn off for distillative purification, and a gas mixture from the absorption stage (K2) is passed onward to a condensation stage, wherein, in the condensation stage, the gas mixture is condensed, and a condensed phase of the gas mixture is drawn off as acid water (4) and is subjected to a phase separation operation in a phase separation vessel (B1), comprising the steps of:

a) feeding the aqueous phase (4*) of the acid water (4) drawn off from the condensation stage that has been obtained in the phase separation vessel (B1) to an extraction stage (K7) in which acrylic acid present in the acid water (4) is extracted with a second solvent (5), b) feeding the acrylic acid-comprising extract (6) to a stripping column (K8) in which the acrylic acid is removed from the second solvent (5) with cycle gas (8), wherein the second solvent (5) removed is fed back again after the acrylic acid has been stripped out in the extraction stage (K7), c) feeding the acrylic acid-laden cycle gas (9) to a stripping cycle gas scrubber (K5) in which the acrylic acid is removed from the cycle gas (8) with the first solvent stream (10) fed to the stripping gas scrubber (K5) and transferred into the first solvent (3), and d) feeding a first portion of the acrylic acid-laden first solvent (3) back to the absorption stage (K2).

On account of the different process regimes in the third and fourth process variants, an acid water stream (4 or 4*) is obtained in the fourth process variant, which, as well as the low-boiling condensable secondary components as in the third process variant, also obtain high-boiling secondary components, diacrylic acid and residues of solvent constituents. It was therefore considered unviable and unfeasible to date to apply an additional extraction of the acid water as conducted in the third process variant to the fourth process variant.

In the context of the present invention, however, it has been found that, surprisingly, an additional extraction of acrylic acid from the acid water with appropriate adjustments is viable and employable in the fourth process variant as well, and hence can lead to distinctly higher yields of the acrylic acid product.

The process of the invention therefore has the advantage that the provision of an additional acid water extraction with subsequent solvent treatment can distinctly reduce the proportion of acrylic acid present in acid water which is sent to disposal. More particularly, it is possible to reduce the proportion of acrylic acid to below 1% by weight, based on the total weight of the wastewater stream (11). This can simultaneously improve the overall yield of acrylic acid, based on the overall process of the fourth process variant, by up to 2%.

In one development of the process of the invention, the extraction stage (K7) is preceded by a preliminary extraction stage in which a substream (12) of the first solvent stream exiting from the stripping cycle gas scrubber (K5) is fed into the acid water (4), the phases are separated in the phase separation vessel (B1) and then the first solvent (3) separated off is fed to the absorption stage (K2), and the acid water (4*) separated off in the phase separation vessel (B1), after preliminary extraction in the preliminary extraction stage, is introduced into the extraction column (K7).

The preliminary extraction upstream of the extraction stage (K7), as well as removing the solvent from the acid water (4), can especially significantly reduce the proportion of diacrylic acid in the first solvent stream (10), especially to a value below 1.5%, based on the total weight of the first solvent stream (10). This dimeric acrylic acid is taken up in the acid water stream (4) and sent to the extraction stage (K7).

In order to enable more efficient removal of low-boiling secondary components such as acetic acid, acetaldehyde, formaldehyde, acrolein and glyoxal, it has been found to be advantageous when the absorption stage (K2) is operated with a feed temperature of 45° C. to 65° C. and a drain temperature of 100° C. to 125° C., as a result of which the acid water (4) drawn off from the condensation stage also comprises diacrylic acid as well as an elevated content of acrylic acid.

The increase in temperature prevents the formation or entrainment of glyoxal, which is a polymerization-promoting component that lowers the purity of the acrylic acid. The advantage of the smaller amount of glyoxal results in a higher proportion of acrylic acid in the acid water and increased formation of diacrylic acid.

One of the reasons why extraction in the fourth process variant is economically viable with the present invention is that the absorption stage (K2) can be operated at higher temperature. The effect of the elevated temperature is more effective removal of low-boiling secondary components, which improves the fouling characteristics in downstream heat exchangers and separation apparatus and the product quality. The mode of operation at elevated temperature in the absorption stage (K2) of the fourth process variant increases plant availability because downstream plant components are soiled less quickly and hence longer cycles can be run without shutdown for cleaning. In addition, there is a drop in energy consumption because fewer low-boiling components have to be removed in the separating operations downstream of the absorption in order to achieve the target quality of the product. In this case, however, there is also a rise in the proportion of acrylic acid and diacrylic acid in the acid water. In addition to the longer period of operation, the result is thus a higher recovery potential for acrylic acid from the acid water.

In a specific development of this embodiment, the diacrylic acid is selectively extracted as well as the acrylic acid, split in the stripping column (K8) in step b), and in this way obtained as monomeric acrylic acid.

This increases the overall yield of the fourth process variant by a further 0.5% to 1%.

In one development, the stripping cycle gas scrubber (K5), in the flow of the first solvent (3), is preceded by a cooling device (W1) with which the first solvent (3) is precooled, in order to compensate for the elevated energy input as a result of the introduction of the stripping cycle gas from the stripping column (K8) of the acid water extraction.

The higher temperature of the gas stream fed to the stripping cycle gas scrubber (K5) would significantly increase the temperature conditions in this column and hence greatly reduce the intended scrubbing effect on the cycle gas in the column. The provision of the cooling device (W1) can keep the temperature in the stripping cycle gas column (K5) at the desirably low level of 30° C. to 50° C. and hence establish the desired scrubbing effect without losses.

It has been found to be advantageous for the achievement of a maximum recovery rate of acrylic acid and diacrylic acid when the stripping column (K8) is operated at a temperature of at least 170° C. in the bottom of the column, preferably at 180° C., more preferably at 190° C., and the dwell time of the liquid supplied to the bottom circuit of the stripping column (K8) is >0.5 h, more preferably >1 h.

In a specific embodiment, the first solvent comprises a mixture of Diphyl and dimethyl phthalate, and the second solvent dimethyl phthalate or diethyl phthalate. According to the present invention, "Diphyl" is understood to mean a diphenyl oxide/diphenyl eutectic in a ratio of 3:1. A mixture comprising Diphyl and dimethyl phthalate has been found to be useful as first solvent with regard to absorption capacity for acrylic acid with simultaneously low fouling characteristics in the absorption. Dimethyl phthalate and diethyl phthalate are notable for a high selective extraction capacity for acrylic acid in a substance mixture of water and other organic acids, for example formic acid and acetic acid, and diethyl phthalate is particularly suitable since it has a very low solubility in the raffinate after extraction coupled with high selectivity for acrylic acid alongside lower carboxylic acids such as acetic acid and formic acid.

It has been found to be advantageous for quantitative extraction when this is conducted in the extraction column (K7) at temperatures of <80° C., preferably 40° C., in order to minimize losses of the extractant (second solvent).

Where process features are mentioned in the description of the plant of the invention that follows, these relate more particularly to the process of the invention. Physical features that are cited in the present description of the process of the invention likewise relate to the plant of the invention.

The abovementioned objective technical problem is achieved in the second aspect of the present invention by a plant for recovery of acrylic acid having an absorption stage (K2) for absorption of acrylic acid from the reaction mixture from a gas phase oxidation and a subsequent condensation stage for condensation of the gas mixture as acid water (4), further comprising an extraction stage (K7) for extraction of the acrylic acid present in the acid water (4) with a second solvent (5), wherein the extraction stage (K7) is downstream of the condensation stage (K2) and connected thereto via an acid water conduit, a stripping column (K8) for removing the acrylic acid with cycle gas (13) from the second solvent (5), wherein the stripping column (K8) is downstream of the extraction stage (K7) and connected thereto via an extract conduit, a solvent conduit which connects the stripping column (K8) and the extraction stage (K7) for recycling of the second solvent (5) into the extraction stage (K7), a bottoms heat exchanger (W3) in the bottoms circuit of the stripping column (K8) for providing of the energy required for the virtually complete stripping of the acrylic acid out of the extract stream, a stripping cycle gas scrubber (K5) for removal of the acrylic acid with a first solvent stream (10) fed to the stripping cycle gas scrubber (K5) from the cycle gas, wherein the stripping gas scrubber (K5) is downstream of the stripping column (K8) and connected thereto via a cycle gas conduit, and a first conduit for feeding a first portion of the acrylic acid-laden first solvent (3) back to the absorption stage (K2).

The plant of the invention is more particularly designed to conduct the above-described process of the invention.

The plant of the invention in principle has the same advantages as the process of the invention, namely that the provision of an additional acid water extraction (extraction stage (K7)) with subsequent solvent treatment (stripping column (K8)) can distinctly reduce the proportion of acrylic acid present in acid water which is sent to disposal.

On account of the different process regimes in the fourth process variant compared to the third process variant, it was considered to be unviable and unfeasible, on account of the high-boiling secondary components such as maleic acid, phthalic acid and residues of first solvent that are present in the acid water for the fourth process variant, to apply an additional extraction stage for the acid water, as present in principle in the third process variant, to the process concept of the fourth process variant.

In the context of the present invention, however, it has been found that, surprisingly, the provision of an additional extraction stage (K7) for the acrylic acid from the acid water with correspondingly revised designs is also viable and employable in adapted plants for the fourth process variant four and hence can lead to distinctly higher yields of the acrylic acid product.

In one development of the plant of the invention, this further comprises a preliminary extraction stage disposed upstream of the extraction stage (K7) in the acid water conduit.

The provision of the preliminary extraction of the invention enables not only the removal of solvent from the acid water but more particularly a significant increase in the proportion of diacrylic acid in the stream of the first solvent (3).

In another embodiment of the plant of the invention, the plant also comprises a cooling device (W1) for precooling of the first solvent stream (10), wherein the cooling device (W1) is disposed upstream of the stripping cycle gas scrubber (K5).

The provision of the cooling device (W1) can distinctly reduce any adverse effect of the stripping cycle gas scrubber (K5) as a result of the higher temperature of the gas stream supplied.

It is further preferable when a crossflow heat exchanger (W2) for heating the extract stream before it is fed into the stripping column (K8) is provided in the plant of the invention, with simultaneous cooling of the depleted extractant stream from the extraction column (K7).

In another development, a heat exchanger (W4) for cooling the extractant stream before entry into the extraction column (K7) is provided in the plant of the invention. This heat exchanger (W4) serves to limit the losses of the second solvent via the raffinate.

Further aims, features, advantages and possible uses will be apparent from the description that follows of embodiments that do not restrict the invention with reference to the figures. All features described and/or illustrated in figures, alone or in any combination, form the subject matter of the invention even irrespective of their combination in the claims or the dependency reference thereof. The figures show:

Both technical and economic factors affect the economic viability of the recovery of acrylic acid. The technical factors include the fact that raising of the temperature in the absorption stage K2 extends the service life of the plant, but simultaneously also increases the acrylic acid concentration in the acid water. The economic factors especially include the rise in the price of propene in recent years by 40%. The acid water in the present case comprises about 2.5% of the total acrylic acid production and, according to prior art, goes directly to incineration. Since the economic incentive is now quite high, the economic potential at a conservative estimate being €2 to €4 million per annum and plant, the present invention brings enormous benefits.

Figure 1:
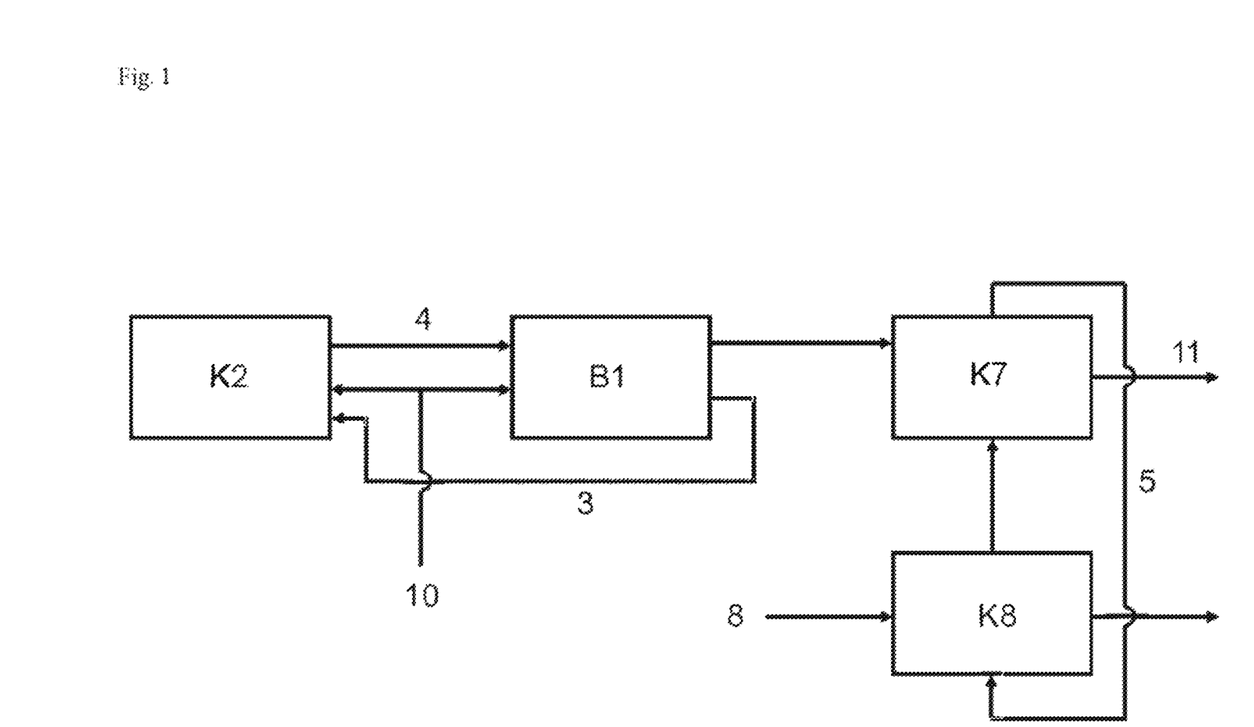
FIG. 1 a schematic diagram of the inventive part of a plant for recovery of acrylic acid, FIG. 2 a flow diagram of the inventive part of the plant shown in FIG. 1 and FIG. 3 a diagram showing the influence of the absorption temperature on the losses of acrylic acid.

FIG. 1 shows a schematic of the basic principle of the relevant part of a plant of the invention for performance of the process of the invention. Acid water from absorption and condensation, i.e. from the absorption stage K2 and the condensation stage, is first sent to the preliminary extraction stage and then routed into the extraction stage K7. In the preliminary extraction stage, the first Diphyl solvent is removed and sent back to the absorption stage K2. In the extraction stage K7, the second dimethyl phthalate solvent comprising the acrylic acid is removed from the acid water and circulated via the stripping column K8 to the extraction stage K7. The acrylic acid removed in the stripping column K8 is fed to the stripping cycle gas scrubber K5.

Figure 2:
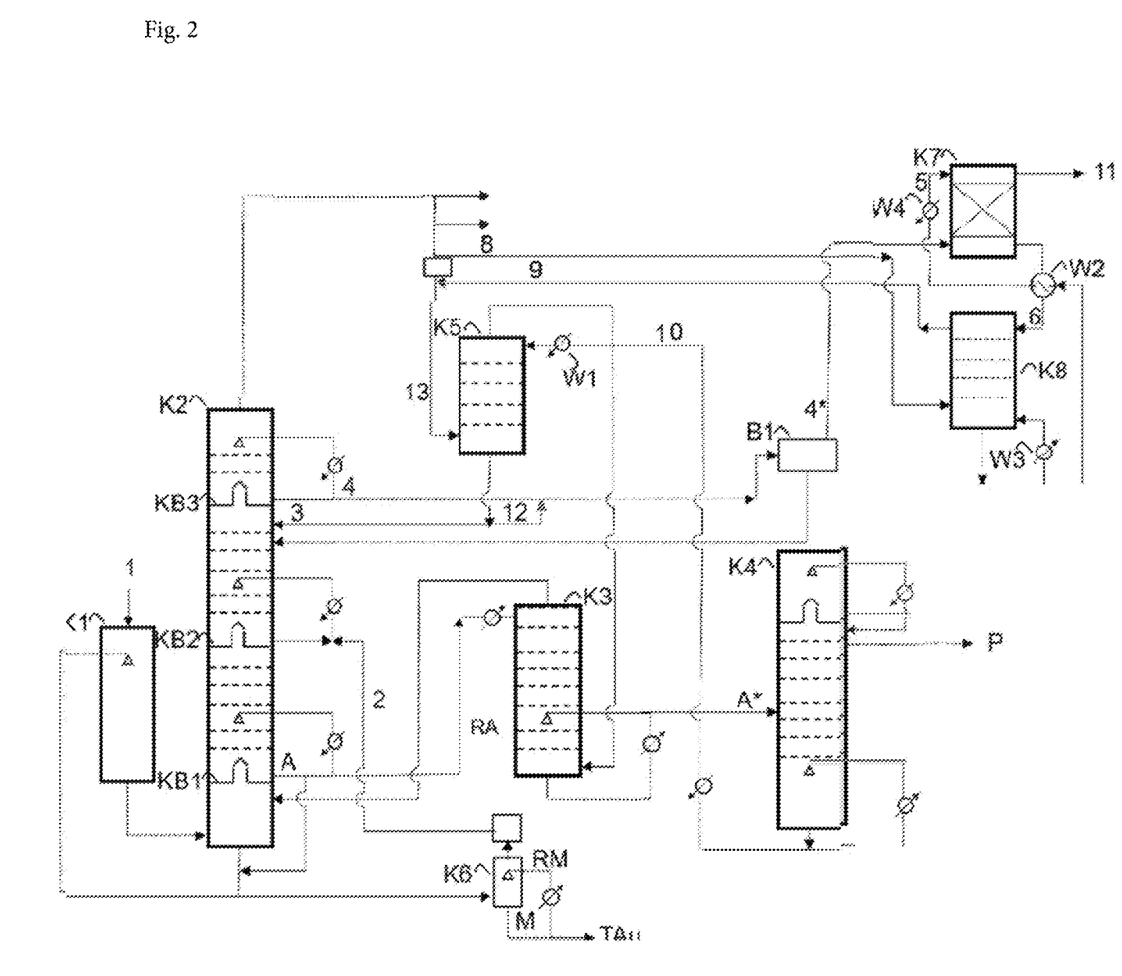

FIG. 2 shows a flow diagram of the inventive part of the plant of the invention shown in FIG. 1, which corresponds in terms of its basic structure to a plant of the fourth process variant, but according to the invention has an acid water extraction in the extraction stage K7 with subsequent solvent recovery and acrylic acid removal in the stripping column K8.

The extraction column K7 preferably has a structured packing as separating internals and more preferably a packing divided into individual segments by plates (as described in WO 2015/091628 A1).

In the preferred version, the stripping column K8 is equipped with plates (dual-flow, Thormann, sieve or bubble-cap trays).

The bottoms heat exchanger W3 used in the stripping column K8 is preferably a forced circulation flash evaporator.

Figure 3:
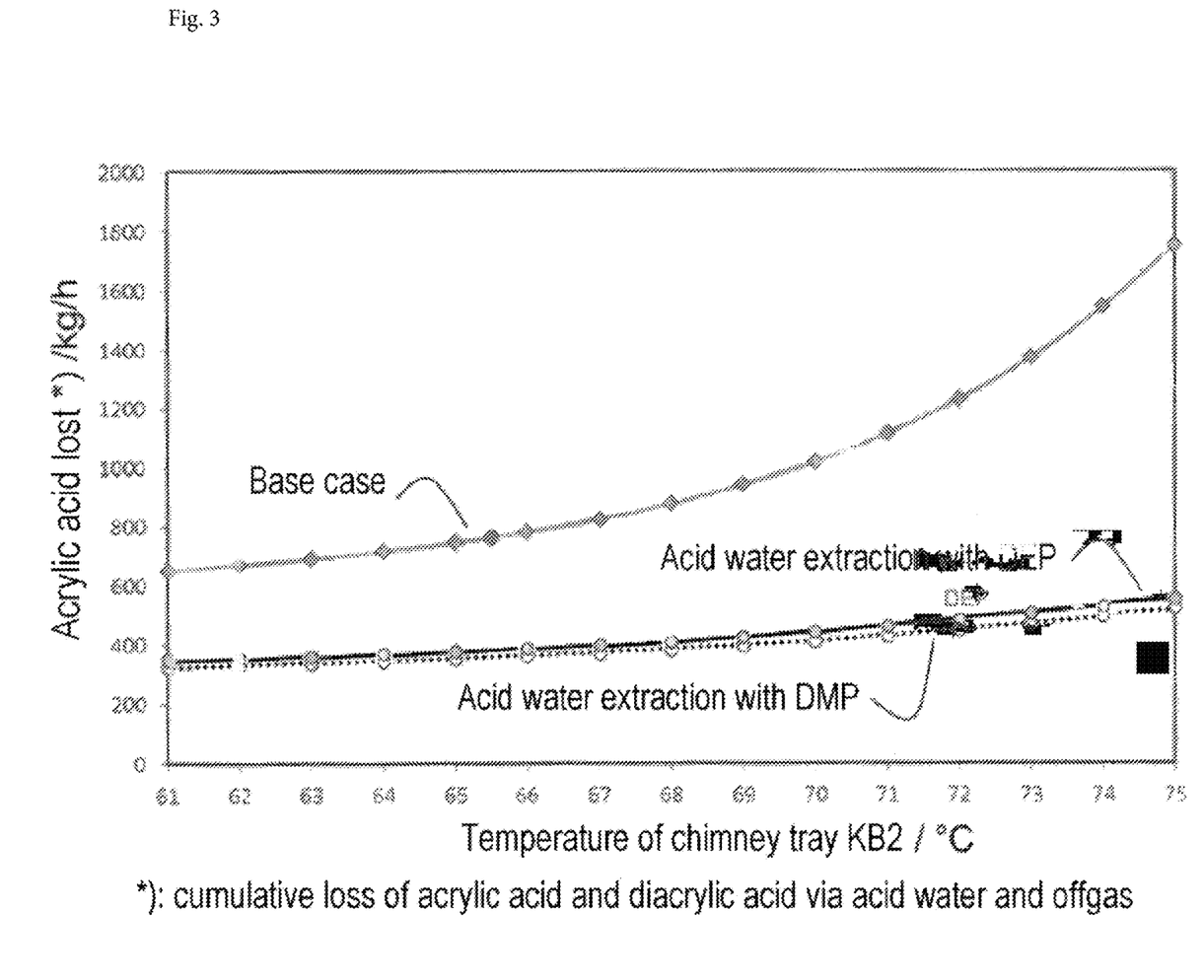

FIG. 3 shows how the acrylic acid losses rise with rising temperature in the solvent feed, and how far these losses can be reduced by means of extraction. Solvents shown here in comparison are diethyl phthalate (DEP) and dimethyl phthalate (DMP), particular preference being given to dimethyl phthalate since it is already a fixed constituent of the first solvent.

One advantage of the process conditions of the workup by the third process variant is that virtually no diacrylic acid is present in the acid water output from the condensation column. By contrast, in the fourth process variant, a significant amount of diacrylic acid is formed, or goes through the preliminary extraction into the acid water 4 drawn off from the absorption stage K2. Since this water is sent directly to a thermal disposal, this proportion of diacrylic acid in the acid water 4 constitutes a direct loss of acrylic acid.

The aim of this preliminary extraction was to separate the medium-boiling and high-boiling secondary components from the first solvent, not to recover acrylic acid. In particular, the anhydrides of phthalic acid and maleic acid were removed here. In this process regime, a portion of the solvent was run in each case through the preliminary extraction. In this solvent, there are small proportions (0.5% by weight-1.5% by weight) of diacrylic acid, which is largely transferred to the acid water by the preliminary extraction. In the fourth process variant, this not inconsiderable proportion of dimerized product too was withdrawn from the process and discarded as waste.

The process of the invention is described in detail hereinafter.

The aim of the present invention was to increase the economic viability of the fourth process variant for workup even in the case of elevated feed temperatures of the first solvent to the absorber. Elevated feed temperatures here mean temperatures >50° C.

In the extraction stage K7 of the invention for the acid water 4, the acid water stream 4* is supplied at the base and contacted with the stream of the second solvent 5, preferably dimethyl phthalate (DMP), in a countercurrent extraction. The dimethyl phthalate here absorbs the acrylic acid (and diacrylic acid) in high selectivity and is withdrawn from the extraction stage K7 as stream 6. At the top of the extraction stage K7, the raffinate 11 is removed, which consists essentially of water and comprises small amounts of acetic acid, formic acid, phthalic acid and maleic acid. This is sent to disposal.

The acrylic acid-laden extract/second dimethyl phthalate solvent, after the stripping column K8 of the invention has been heated, is applied at the top, and the acrylic acid is stripped out with the cycle gas 8. The heat required for the stripping is fed in at the bottom via a solvent circuit via a bottoms heat exchanger W3.

The use of the cycle gas which is already used in the process for the removal of acetic acid and of acrolein and further constituents offers the advantage that the process is physically designed therefor, and it does not have any effect on the process.

Since the diacrylic acid concentration in the acid water is higher in the fourth process variant and this accumulates in the bottom of the stripping column K8, a breakdown reaction is additionally initiated in accordance with the invention in the bottom of the stripping column K8. This reaction sets in at temperatures of >165° C. Virtually complete recleavage requires dwell times of the second solvent at these temperatures of more than 10 min, preferably more than 30 min. By virtue of the mode of operation of the stripping column K8, the diacrylic acid likewise present in the stream of the second solvent 5 in the bottoms is recleaved to monomeric acrylic acid and returned to the process via the cycle gas stream 9.

The breakdown of the diacrylic acid increases the total amount of acrylic acid recycled in accordance with the invention. The total amount of the stripping gas or cycle gas is therefore greater than in the corresponding columns for the third process variant, which has an effect on the geometric design of the stripping column K8 of the invention.

Acrylic acid- and diacrylic acid-depleted second dimethyl phthalate solvent is withdrawn from the bottom of the stripping column K8, while the cycle gas 9 with a significant amount of acrylic acid is drawn off at the top of the stripping column K8.

The cycle gas stream 9 laden with the recycled acrylic acid from the stripping column K8 is fed to the stripping cycle gas scrubber K5. As a result, the gas loading of this column remains virtually unchanged compared to operation without the acid water extraction of the invention. But since the temperature of the cycle gas stream 9 is much higher than in the conventional fourth process variant, according to the invention, there is an upstream cooling device W1 with which the first solvent stream 10 is precooled before entry into the stripping cycle gas scrubber K5. Without this precooling, under some circumstances, a rise in secondary components would have to be expected in the product. If significant amounts of secondary components should nevertheless occur in the product in further operation, this can be counteracted by a further lowering of the temperature of the first solvent stream 10, for example by using cold water rather than cooling water in the cooling device W1.

The basis used for the design of the plant was the design of the stripping column as used in the third process variant. This now inventive stripping column K8 was designed with nine equilibrium stages and a bottoms specification, i.e. of the purity of solvent recycled, of 1385 ppm of acrylic acid. In order to minimize the design risk, the cycle gas stream through the stripping column K8 was increased until the acrylic acid concentration at the top of the stripping column K8 in the cycle gas recycled into the process was as high as in the third process variant, i.e. about 5% by weight. Thus, a similar concentration profile in the stripping column K8 to that in the third process variant surprisingly arises, such that the design can be implemented with low risk on the basis of the existing columns.

In principle, the risk in respect of the operation of the plant for the process of the invention is relatively low since the entire acid water extraction of the invention can be circumvented in a bypass, and hence the state prior to the alteration in accordance with the invention can be restored at any time.

EXAMPLE

In an industrial plant that works according to the fourth process variant, 250 t/h of a reaction gas with a temperature of 265° C. was introduced into a direct gas cooler. The composition of the gas was:

| | |
|---|---|
| acrylic acid | 11.6% by weight |
| water | 5.0% by weight |
| $O_2$, $N_2$, CO, $CO_2$ | 82.3% by weight |
| propene, propane, acrolein | 0.4% by weight |
| acetic acid | 0.3% by weight |
| other carboxylic acids and aldehydes | 0.4% by weight |

In an absorption stage K2, the gas was subjected to a countercurrent absorption in which 138 t/h of a solvent mixture (first solvent 3) at a temperature of 59° C. and with a composition of

| | |
|---|---|
| Diphyl | 70.3% by weight |
| dimethyl phthalate | 19.7% by weight |
| acrylic acid | 2.8% by weight |
| diacrylic acid | 3.1% by weight |
| acetic acid | 0.4% by weight |
| phthalic anhydride | 0.7% by weight |
| maleic anhydride | 0.4% by weight |
| water | 0.4% by weight |

| other carboxylic acids, aldehydes and inhibitors | 2.2% by weight | was introduced into the upper portion of the absorption section of the absorption stage K2.

In the upper portion of the absorption stage K2, the reaction gas was cooled down further to 28° C. This gave, from the condensate section, an acid water stream of 15.5 t/h at a temperature of 44° C. and with a composition of

| water | 64.1% by weight |
| Diphyl | 11.0% by weight |
| acrylic acid | 10.5% by weight |
| diacrylic acid | 0.2% by weight |
| acetic acid | 6.7% by weight |
| dimethyl phthalate | 2.7% by weight |
| formic acid | 0.7% by weight |
| maleic acid | 1.0% by weight |
| other carboxylic acids and aldehydes | 3.1% by weight | which was fed to a phase separator B1. Prior to entry into the phase separation vessel B1, 16.2 t/h of first solvent that was taken from the bottom of the stripping cycle gas scrubber K5 was mixed into the acid water 4 for preliminary extraction. The solvent separated out in the phase separation vessel B1, after preliminary extraction, was routed into the absorption section of the absorption stage K2 at a volume flow rate of 18.3 t/h.

A mixture of first solvent with acrylic acid was drawn off from the absorption section of the absorption stage K2 at a temperature of 114° C. and with a composition of

| Diphyl | 48.6% by weight |
| dimethyl phthalate | 13.3% by weight |
| acrylic acid | 33.4% by weight |
| diacrylic acid | 1.9% by weight |
| maleic acid | 0.7% by weight |
| water | 0.2% by weight |
| acetic acid | 0.2% by weight |
| other carboxylic acids, aldehydes inhibitors | 1.7% by weight | of which 57.8 t/h was routed into the bottom of the absorption stage K2 and 229 t/h into a low boiler removal.

After passage through the low boiler removal, the acrylic acid-laden first solvent stream 10 was subjected to a vacuum distillation, and the product drawn off was 30 t/h of acrylic acid with a purity of 99.7% by weight at the side draw from the purifying column.

An acrylic acid-depleted stream of the first solvent of 152.7 t/h was taken at a temperature of 181° C. from the purifying column at the bottom and, after being cooled to 53° C., was routed to the top of the stripping cycle gas scrubber K5. The depleted solvent had the following composition:

| Diphyl | 71.8% by weight |
| dimethyl phthalate | 20.0% by weight |
| acrylic acid | 1.7% by weight |
| diacrylic acid | 3.2% by weight |
| phthalic anhydride | 0.7% by weight |
| maleic acid | 0.8% by weight |
| other carboxylic acids, aldehydes inhibitors | 1.8% by weight |

After preliminary extraction and phase separation, an acid water stream of 15 t/h was taken from the vessel B1 having a capacity of 30 m³ with a composition of

| water | 76.3% by weight |
| acrylic acid | 9.6% by weight |
| diacrylic acid | 2.5% by weight |
| acetic acid | 6.6% by weight |
| dimethyl phthalate | 0.5% by weight |
| formic acid | 0.7% by weight |
| maleic acid | 1.8% by weight |
| other carboxylic acids and aldehydes | 2.0% by weight | and introduced into the acid water extraction column K7 at a temperature of. The acid water extraction column K7 had a diameter of 0.9 m and was packed over a length of 34 m with a Montz B1-350 structured packing. The packing was divided into four circular segments of equal size over the entire length by means of vertical plates in a crossed arrangement. For reduction of the extraneous phase in the raffinate, there was a bed of length 300 m of 25 mm Pall rings in the upper phase separation region. The volume of the upper and lower phase separation regions was 3 m³.

For extraction of the acrylic acid and diacrylic acid present in the acid water, a second solvent 5 that consisted essentially of dimethyl phthalate was introduced at the top of the extraction column K7 in an amount of 15 t/h at a temperature of 55° C., where it was distributed uniformly over the cross section of the column K7. An acrylic acid-depleted acid water stream of 12 t/h left the extraction column K7 with a composition of

| water | 89.5% by weight |
| acetic acid | 3.7% by weight |
| acrylic acid | 0.8% by weight |
| diacrylic acid | 0.1% by weight |
| dimethyl phthalate | 0.9% by weight |
| maleic acid | 2.3% by weight |
| other carboxylic acids and aldehydes | 2.7% by weight |

This acid water was fed into a plant for thermal treatment. Since there was still a residual content of acrylic acid and diacrylic acid in the raffinate stream 11 fed to the disposal unit, the loss of product of value was 108 kg/h or 0.36% based on the production of 30 t/h.

After phase separation at the base of the extraction column K7, the extract, in an amount of 18 t/h and with a composition of

| water | 3.7% by weight |
| acetic acid | 3.1% by weight |
| acrylic acid | 7.6% by weight |
| diacrylic acid | 2.3% by weight |
| dimethyl phthalate | 80.9% by weight |
| Diphyl | 0.4% by weight |
| other carboxylic acids and aldehydes | 2.0% by weight | after crossflow heat exchange in the cross flow heat exchanger W2, at a temperature of 110° C., was run to the top of the stripping column K8. The stripping column K8 had a length of 16.3 m and had an internal diameter that was uniform over the length of 2.6 m. The column K8 was equipped with 5 dual-flow trays in the lower section and with 15 valve trays in the upper section. The tray separation in the region of the dual-flow trays was 600 mm, and in the valve tray region 500 mm. The bottoms region of column K8 had a capacity of 14 m³ to accommodate the bottom product.

The stripping gas was run in an amount of 30 t/h at a temperature of 130° C. into the bottom of the stripping column K8, and corresponded in terms of this composition after compression in a cycle gas compressor to the gas that was obtained at the top of the absorption stage K2.

| | |
|---|---|
| acrylic acid | 0.2% by weight |
| water | 1.9% by weight |
| $O_2$, $N_2$, CO, $CO_2$ | 97.4% by weight |
| propane, propene, acrolein | 0.3% by weight |
| acetic acid | 0.1% by weight |
| other carboxylic acids and aldehydes | 0.1% by weight |

The bottom product from the stripping column K8 was heated to 190° C. by means of a steam-heated shell-and-tube heat exchanger and circulated via the tray 5. The liquid volume of the pipeline system together with the heat exchanger through which the liquid was circulated was 2.5 m³.

The acrylic acid- and diacrylic acid-depleted bottom product from column K8, after indirect heat exchange in heat exchangers W2 and W4, was cooled down to 55° C. and introduced back to the top of the extraction column K7. The second solvent entering the extraction column K7 had the following composition:

| | |
|---|---|
| dimethyl phthalate | 97.1% by weight |
| Diphyl | 0.4% by weight |
| acrylic acid | 0.1% by weight |
| diacrylic acid | 0.4% by weight |
| benzoic acid | 1.0% by weight |
| phthalic acid/phthalic anhydride | 0.6% by weight |
| maleic acid/maleic anhydride | 0.3% by weight |
| phenothiazine | 0.1% by weight |

Comparative Experiment

The settings in the synthesis and in the workup were retained, and the acid water that left the vessel B1 was routed past the acid water extraction consisting of columns K7 and K8 and introduced directly into the disposal unit, and the stripping cycle gas that was routed via column K8 beforehand was introduced directly into the bottom of stripping column K5. With this setting, there was no change in the composition of the acid water apart from the acetic acid content, which changed from 3.7% by weight to 3.4% by weight.

Under these conditions, there was a reduction in production to 28.6 t/h. The loss of acrylic acid and diacrylic acid was 1.8 t/h or 6.2% of production.

LIST OF REFERENCE NUMERALS

1 reaction mixture
3 first solvent
4 acid water
4\* aqueous phase of acid water 4
5 second solvent
6 extract
7
8 cycle gas
9 acrylic acid-laden cycle gas
10 first solvent stream
11 wastewater stream
12 substream of the first solvent stream 10
13 cycle gas
B1 phase separation vessel
K1 column K1
K2 absorption stage
K3 column K3
K4 column K4
K5 stripping cycle gas scrubber
K6 column K6
K7 extraction stage
K8 stripping column
KB1 chimney tray 1
KB2 chimney tray 2
KB3 chimney tray 3

The invention claimed is:

1. A process for recovering acrylic acid which is obtained by catalytic gas phase oxidation of propene,
   wherein, in an absorption stage (K2), the acrylic acid is absorbed from a reaction mixture (1) from a gas phase oxidation with a first solvent (3) and is drawn off for distillative purification, and a gas mixture from the absorption stage (K2) is passed onward to a condensation stage,
   wherein, in the condensation stage, the gas mixture is condensed, and a condensed phase of the gas mixture is drawn off as acid water (4) and is subjected to a phase separation operation in a phase separation vessel (B1),
   comprising the steps of
   a) feeding an aqueous phase (4\*) of the acid water (4) drawn off from the condensation stage that has been obtained in the phase separation vessel (B1) to an extraction stage (K7) in which acrylic acid present in the acid water (4) is extracted with a second solvent (5),
   b) feeding an acrylic acid-comprising extract (6) to a stripping column (K8) in which the acrylic acid is removed from the second solvent (5) with cycle gas (8), wherein the second solvent (5) removed is fed back again after the acrylic acid has been stripped out in the extraction stage (K7),
   c) feeding an acrylic acid-laden cycle gas (9) to a stripping cycle gas scrubber (K5) in which the acrylic acid is removed from the cycle gas with a first solvent stream (10) fed to the stripping cycle gas scrubber (K5) and transferred into the first solvent (3), and
   d) feeding a first portion of an acrylic acid-laden first solvent (3) back to the absorption stage (K2).

2. The process according to claim 1, wherein the extraction stage (K7) is preceded by a preliminary extraction stage in which a substream (12) of a first solvent stream exiting from the stripping cycle gas scrubber (K5) is fed into the acid water (4), the phases are separated in the phase separation vessel (B1) and then the first solvent (3) separated off is fed to the absorption stage (K2), and the acid water separated off in the phase separation vessel (B1), after preliminary extraction in the preliminary extraction stage, is introduced into the extraction column (K7).

3. The process according to claim 1, wherein the absorption stage (K2) is operated at a feed temperature of 45° C. to 60° C. and a drain temperature of 100° C. to 120° C., as a result of which the acid water (4) drawn off from the condensation stage not only has an elevated acrylic acid content but also comprises diacrylic acid.

4. The process according to claim 3, wherein the diacrylic acid is split in the stripping column (K8) in step b) and in this way is recovered as monomeric acrylic acid.

5. The process according to claim 1, wherein the stripping cycle gas scrubber (K5), in the flow of the first solvent (3), is preceded by a cooling device (W1) with which the first solvent (3) is precooled.

6. The process according to claim 1, wherein the stripping column (K8) is operated at a temperature of at least 170° C. in the bottom of stripping column (K8), and the dwell time of the liquid fed to the bottoms circuit of the stripping column (K) is >0.5 h.

7. The process according to claim 1, wherein the first solvent comprises Diphyl and the second solvent comprises dimethyl phthalate or diethyl phthalate.

8. The process according to claim 1, wherein the extraction in the extraction column (K7) is conducted at temperatures of <80° C.

9. A plant for recovery of acrylic acid, having an absorption stage (K2) for absorption of acrylic acid from the reaction mixture from a gas phase oxidation and a subsequent condensation stage for condensation of the gas mixture as acid water (4), further comprising
- an extraction stage (K7) for extraction of the acrylic acid present in the acid water (4) with a second solvent (5), wherein the extraction stage (K7) is downstream of a condensation stage and connected thereto via an acid water conduit,
- a stripping column (K8) for removing the acrylic acid with cycle gas (13) from the second solvent (5), wherein the stripping column (K8) is downstream of the extraction stage (K7) and connected thereto via an extract conduit,
- a solvent conduit which connects the stripping column (K8) and the extraction stage (K7) for recycling of the second solvent (5) into the extraction stage (K7),
- a bottoms heat exchanger (W3) in the bottoms circuit of the stripping column (K8) for providing of the energy required for the virtually complete stripping of the acrylic acid out of an extract stream,
- a stripping cycle gas scrubber (K5) for removal of the acrylic acid with a first solvent stream (10) fed to the stripping cycle gas scrubber (K5) from a cycle gas, wherein the stripping cycle gas scrubber (K5) is downstream of the stripping column (K8) and connected thereto via a cycle gas conduit, and
- a first conduit for feeding a first portion of the acrylic acid-laden first solvent (3) back to the absorption stage (K2).

10. The plant according to claim 9, further comprising a preliminary extraction stage disposed upstream of the extraction stage (K7) in the acid water conduit.

11. The plant according to claim 9, further comprising a cooling device (W1) for precooling of the first solvent stream (10), wherein the cooling device (W1) is disposed upstream of the stripping cycle gas scrubber (K5).

12. The plant according to claim 9, further comprising a crossflow heat exchanger (W2) for heating the extract stream before it is fed into the stripping column (K8), with simultaneous cooling of the depleted extractant stream from the extraction stage (K7).

13. The plant according to claim 9, further comprising a heat exchanger (W4) for cooling the extractant stream before entry into the extraction stage (K7).

* * * * *